(12) United States Patent
Park

(10) Patent No.: US 11,079,023 B2
(45) Date of Patent: Aug. 3, 2021

(54) SEALABILITY-ENHANCED SOFT SEAT PLATE TYPE GATE VALVE

(71) Applicant: DONGHAE Co., Ltd., Daegu (KR)

(72) Inventor: Young Su Park, Daegu (KR)

(73) Assignee: DONGHAE CO., LTD., Daegu (KR)

( * ) Notice: Subject to any disclaimer, the term of this patent is extended or adjusted under 35 U.S.C. 154(b) by 0 days.

(21) Appl. No.: 16/807,165

(22) Filed: Mar. 3, 2020

(65) Prior Publication Data
US 2020/0284355 A1 Sep. 10, 2020

(30) Foreign Application Priority Data
Mar. 4, 2019 (KR) .................. 10-2019-0024575

(51) Int. Cl.
  *F16K 3/02* (2006.01)
  *F16K 27/04* (2006.01)
  *F16K 25/00* (2006.01)
  *F16K 3/314* (2006.01)

(52) U.S. Cl.
CPC .......... *F16K 3/0281* (2013.01); *F16K 3/0227* (2013.01); *F16K 3/314* (2013.01); *F16K 25/00* (2013.01); *F16K 27/044* (2013.01)

(58) Field of Classification Search
CPC .... F16K 3/0281; F16K 27/044; F16K 3/0227; F16K 3/314; F16K 25/00
USPC ................... 251/326–329, 332–334
See application file for complete search history.

(56) References Cited

U.S. PATENT DOCUMENTS

| | | | | |
|---|---|---|---|---|
| 3,945,606 A * | 3/1976 | McDonald | ............... | F16K 3/30 251/326 |
| 3,993,092 A * | 11/1976 | Still | ...................... | F16K 3/0263 137/454.2 |
| 4,009,727 A * | 3/1977 | Bailey | ................... | F16K 3/0281 137/454.2 |
| 4,377,274 A * | 3/1983 | Mayhew, Jr. | ......... | F16K 3/0281 251/266 |
| 6,375,157 B1 * | 4/2002 | Van de Lande | ...... | F16K 27/044 251/327 |
| 7,350,766 B2 * | 4/2008 | Comstock | ............. | F16K 3/0227 251/328 |
| 2014/0332707 A1* | 11/2014 | Reilly | ................... | F16K 3/0272 251/264 |

FOREIGN PATENT DOCUMENTS

| | | |
|---|---|---|
| KR | 100810716 B1 | 3/2008 |
| KR | 101563464 B1 | 10/2015 |
| KR | 1020170073394 A | 6/2017 |

OTHER PUBLICATIONS

Park, Young Soo, Apr. 2015, KR 10153464 (translation of foreign reference filed in IDS of Mar. 3, 2020) (Year: 2015).*

(Continued)

*Primary Examiner* — John Bastianelli
(74) *Attorney, Agent, or Firm* — Cantor Colburn LLP

(57) ABSTRACT

A soft seat knife plate type valve is provided with an opening and closing plate to be inserted into a packing. First sealing structures are continuously formed on the packing, and second sealing structures are continuously formed on an edge of the opening and closing plate. The first sealing structures and the second sealing structures are complementary to each other to be removably coupled to each other.

3 Claims, 17 Drawing Sheets

(56) References Cited

OTHER PUBLICATIONS

Kim, Jae Dol, Jun. 2017, KR 1020170073394 (translation of foreign reference filed in IDS of Mar. 3, 2020) (Year: 2017).*
Korean Office Action for KR Application No. 10-2019-0024575 dated Apr. 18, 2019.

* cited by examiner

SEALABILITY-ENHANCED SOFT SEAT PLATE TYPE GATE VALVE

CROSS-REFERENCE TO RELATED APPLICATIONS

This application is based on and claims priority under 35 U.S.C. § 119 to Korean Patent Application No. 10-2019-0024575, filed on Mar. 4, 2019, in the Korean Intellectual Property Office, the disclosure of which is herein incorporated by reference in its entirety.

BACKGROUND

1. Field

The present disclosure relates to a soft seat plate type gate valve which is installed in a tubular body for transferring a fluid such as water, oil, gas or slurry, or powder to adjust transferring of the fluid or powder transferred through the tubular body.

2. Description of the Related Art

As known in related-art technology, a gate valve is installed in a line for supplying various fluids or powder to adjust an amount of supplied fluid. Examples of the gate valve include a metal seat knife (plate-type) gate valve or a soft seat knife plate type gate valve. The metal seat knife (plate type) is used in a thermal power station to produce electricity, and is installed in a tubular body for transferring coal dust with air to adjust transferring of coal dust. The soft seat knife plate type gate valve is mainly used in a line for transferring a fluid such as water, oil or gas.

The above-described soft seat knife plate type gate valve includes an opening and closing plate and a packing coupled to the opening and closing plate. In the soft seat knife plate type gate valve, the opening and closing plate may have difficulty in ascending or descending due to a friction with the packing when it ascends or descends. In addition, since scale such as coal dust (slurry) may be formed on a portion of the packing contacting the opening and closing plate, there is a disadvantage that the opening and closing plate does not completely seal.

Korean Patent No. 10-0810716 ("Knife Gate Valve Having Enhanced Sealing Structure") (hereinafter, referred to as "Korean Patent No. 716") owned by the same applicant as the present application discloses a solution to the above-described problems. In Korean Patent No. 716, a sealing member (packing) is configured as one body, and an opening and closing plate is inserted through a guide groove for the opening and closing plate which is formed on a center portion of the sealing member.

However, there may be structural difficulty in fabricating a mold for the sealing member (packing) of one body which has the guide groove formed thereon in the valve disclosed in Korean Patent No. 716.

In addition, the sealing member (packing) is a consumable product and thus should be frequently replaced. In particular, much time may be required to assemble and dissemble the opening and closing plate and the guide groove in the valve disclosed in Korean Patent No. 716.

Korean Patent No. 10-1563464 (hereinafter, "Korean Patent No. 464") owned by the same applicant as the present application discloses enhanced technology to solve the above-described problem. However, in the valve disclosed in Korean Patent No. 464, the upper half portion of the opening and closing plate smoothly ascends or descends in close contact with a protruding edge formed on the packing, thereby maintaining sealability. However, an edge of the lower half portion of the opening and closing plate is formed to be in contact with a protruding edge of the packing, and thus does not have high sealability. In addition, in the valve disclosed in Korean Patent No. 464, an end of the packing in contact with a lower end surface of the opening and closing plate is deformed due to pressing when the valve is used for a long time, and wearing out such as a reduced friction may be caused due to hardening. Therefore, there is a problem that sealability is reduced with time.

PRIOR ART DOCUMENTS

Patent Documents (Patent Document 0001) Korean Patent No. 10-0810716 (registered on Feb. 28, 2008)
(Patent Document 0002) Korean Patent No. 10-1563464 (registered on Oct. 20, 2015)

SUMMARY

The present disclosure has been developed in order to solve the above-described problems, and an object of the present disclosure is to provide a soft seat plate type gate valve which has enhanced configurations of an opening and closing plate and a packing, thereby enhancing sealability, and can maintain performance without reducing sealability for a long time.

According to an embodiment of the present disclosure, there is provided a soft seat knife plate type valve provided with an opening and closing plate to be inserted into a packing, wherein first sealing structures are continuously formed on the packing, and second sealing structures are continuously formed on an edge portion of the opening and closing plate, wherein the first sealing structures and the second sealing structures are complementary to each other to be removably coupled to each other.

According to an embodiment, there is provided a soft seat knife plate type valve including: a valve main body; a packing removably coupled to the valve main body; and an opening and closing plate configured to be inserted into the packing, wherein the opening and closing plate and the packing are operatively coupled to each other, and the opening and closing plate may be completely inserted into the packing, wherein the packing includes a first packing and a second packing, and the first packing and the second packing are configured to form a space to allow the opening and closing plate to be inserted thereinto, wherein the opening and closing plate and the packing are structured, such that an edge portion of the opening and closing plate is inserted into the insertion space, first, when the opening and closing plate is inserted into the packing, wherein a first sealing structure is formed on the packing, wherein a second sealing structure is formed on the edge portion of the opening and closing plate, wherein the first sealing structure and the second sealing structure have complementary structures to be removably coupled to each other, and wherein, when the opening and closing plate is inserted or not inserted into the packing, the first sealing structure and the second sealing structure are coupled to each other in contact with each other.

In the above-described embodiments, the first sealing structure may have a protruding semicircular shape and the second sealing structure may have a recessed triangular shape.

In the above-described embodiments, the first packing may have a semi-annular ring stacked on an annular ring, and the second packing may have a semi-annular ring stacked on an annular ring, and, when the packing is coupled to the valve main body, the semi-annular ring of the first packing and the semi-annular ring of the second packing may come into contact with each other.

In the above-described embodiments, the first sealing structure may be formed on the semi-annular rings.

The soft seat plate type gate valve according to one or more embodiments of the present disclosure has enhanced structures of the opening and closing plate and the packing, thereby having high sealability which is maintained for a long time. Accordingly, there is an effect of enhancing reliability of performance and functions of the soft seat plate type gate valve.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF EMBODIMENTS

Exemplary embodiments will now be described more fully with reference to the accompanying drawings to clarify objects, other objects, features and advantages of the present disclosure. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

As used herein, the singular forms are intended to include the plural forms as well, unless the context clearly indicates otherwise. It will be further understood that the terms "comprise" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Hereinafter, a configuration of an exemplary embodiment regarding a soft seat plate type gate valve according to an embodiment of the present disclosure will be described by referring to FIGS. 1 to 7 and 17 simultaneously or partially.

Figure 1:
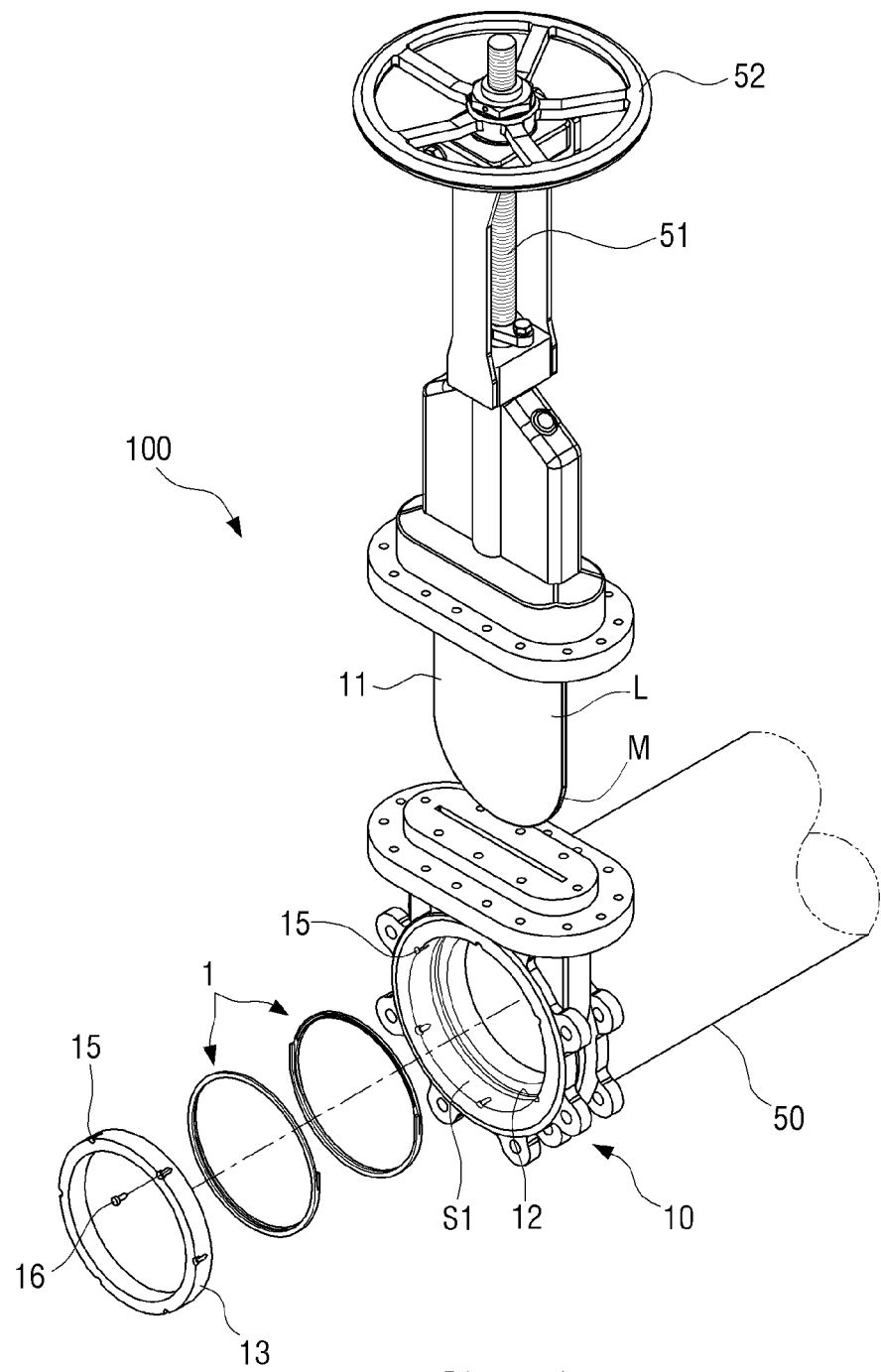
FIG. 1 is an exploded perspective view of a soft seat knife gate valve according to an embodiment of the present disclosure.
Figure 2:
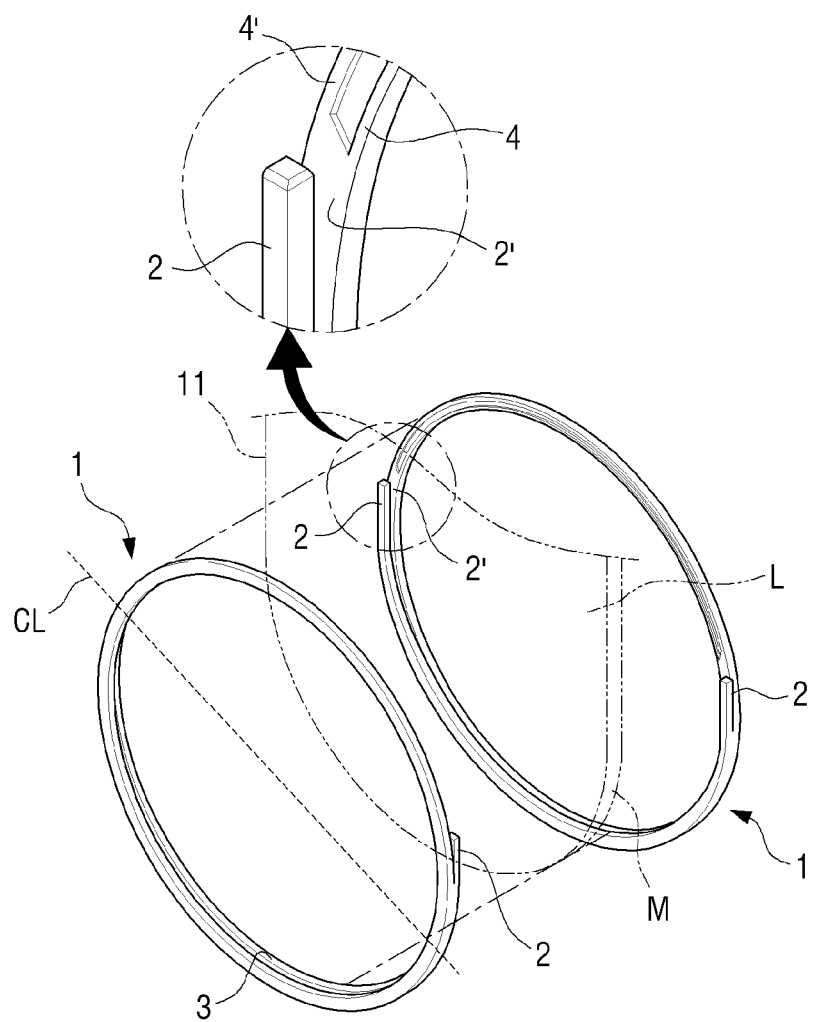
FIG. 2 is a perspective view illustrating a structure of a packing according to an embodiment of the present disclosure.
Figure 3:
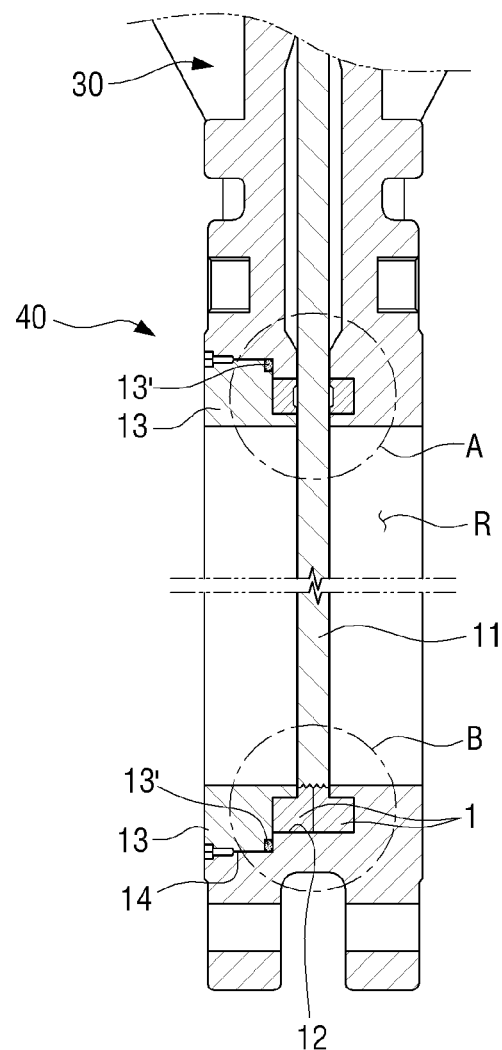
FIG. 3 is a cross-sectional view illustrating the packing and an opening and closing plate in an assembled state according to an embodiment of the present disclosure.
Figure 6:
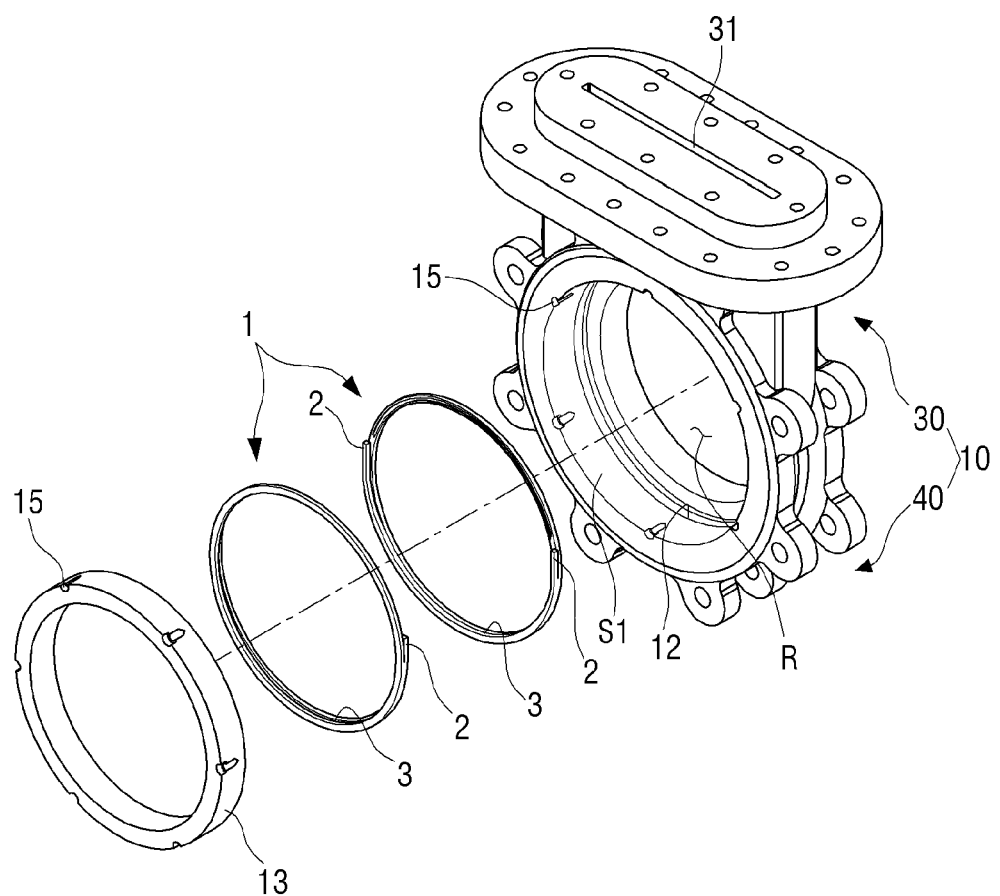
FIG. 6 is an exploded perspective view of the packing and a packing fixing portion in a valve main body according to an embodiment of the present disclosure.

Referring to FIGS. 1 and 6, the soft seat plate type gate valve 100 (hereinafter, referred to as a "valve") according to an embodiment of the present disclosure may include a packing 1, a valve main body 10, and an opening and closing plate 11. The valve 100 may be installed in a transferring tubular body 50 for transferring a fluid to adjust transferring of a fluid transferred through the transferring tubular body 10.

In the detailed description, the term "pipe", "tubular body," "transferring tubular body," or "line" refers to a component providing a space through which a fluid or powder is moved, and these terms are interchangeably used if there is no benefit in distinguishing the terms.

In the detailed description, the term "fluid" refers to solid, liquid, gas, a mixture of solid and liquid, a mixture of solid and gas, a mixture of liquid and gas, or a mixture of solid, liquid, and gas. For example, the solid may be a substance like powder, the liquid may be a substance like water or oil, the gas may be a substance like air, and the mixture may be a substance like slurry. The powder, water, soil, gas, or slurry may be examples and other types of solids, gases, liquids or mixtures may be included in "fluid."

In the detailed description, "adjusting" transferring of a fluid refers to blocking movement of a fluid, allowing movement of a fluid, and allowing movement of a fluid as much as a specific amount.

In the present embodiment, the opening and closing plate 11 may be inserted into the valve main body 10 to completely block transferring of the fluid, to allow only a part of an amount of fluid allowable in the transferring tubular body 10 to be transferred, or to allow all amounts of fluid allowable in the transferring tubular body 10 to be transferred. When the opening and closing plate 11 is completely inserted into the valve main body 10, transferring of the fluid may be completely blocked, and, when the opening and closing plate 11 is partially inserted, only a part of the fluid may be transferred. That is, an amount of transferred fluid (an amount of fluid passing through a cross section of the transferring tubular body 10 for unit time) may be adjusted according how the opening and closing plate 11 is inserted.

In the present embodiment, the opening and closing plate 11 may be inserted into or may not be inserted into the valve main body 11 by an operating rod 51.

In the detailed description, an operation of the inserted opening and closing plate 11 being moved in a direction of being drawn out from the valve main body 10 is referred to as "ascending," and an operation of the opening and closing plate 11 being moved in a direction of being inserted into the valve main body 10 is referred to as "descending." In the detailed description, "inserting" may include "completely inserting" and "partially inserting."

The opening and closing plate 11 may be in a complete insertion state, a partial insertion state, or a non-insertion state with respect to the valve main body 10. The complete insertion state is a state in which the opening and closing plate 11 is inserted into the valve main body 10 so as to completely block the flow of fluid, and the partial insertion state is a state in which the opening and closing plate 11 is inserted into the valve main body 10 so as to allow only a portion of the flow of fluid. In addition, the non-insertion state is a state in which the opening and closing plate 11 is not inserted into the valve main body 10 and allows all flow of fluid. The opening and closing plate 11 and the valve main body 10 may have configurations complementary to each other so as to enter the complete insertion state, the partial insertion state, or the non-insertion state. That is, the opening and closing plate 11 and the valve main body 10 may be operatively coupled to each other so as to enter the complete insertions state, the partial insertion state, or the non-insertion state.

In the present embodiment, the opening and closing plate 11, the operating rod 51, and a handle 52 may be operatively coupled to one another. That is, when the handle 52 is rotated in one direction, the operating rod 51 may descend, and, when the operating rod 51 descends, the opening and closing plate 11 descends toward the valve main body 10. In addition, when the handle 52 is rotated in the opposite direction of the one direction, the operating rod 51 may ascend, and, when the operating rod 51 ascends, the opening and closing plate 11 ascends away from the valve main body 10.

In the present embodiment, the opening and closing plate 11 may be configured to be operatively coupled with the handle 52 to ascend or descend. However, this configuration is merely an example. In another example, the opening and closing plate 11 may be configured to ascend or descend by using an electric motor.

In the present embodiment, the valve 100 may further include the packing 1 and a packing fixing ring 13. One pair of packings 1 may be provided. In the detailed description, the packing 1 may refer to one pair of packings, and one of the packings is referred to as a first packing PK1 and the other one is referred to as a second packing PK2 if there is any benefit in distinguishing them. In addition, the first packing PK1 and the second packing PK2 have the same structure and thus separate reference numerals are not given to the first and second packings on the drawings.

The packing 1 may be removably coupled to the valve main body 10, and the opening and closing plate 11 may be inserted into the packing 1, thereby enhancing sealability of the opening and closing plate 11. The packing fixing ring 12 may be to couple the packing 1 to the valve main body 10 in close contact therewith. These components will be described in detail below with reference to the other drawings.

In the present embodiment, referring to FIGS. 1, 3, 4, and 6, the valve main body 10 includes a first body portion 40 which is formed in a annular ring shape to have a hollow formed in the center R thereof, and a second body portion 30 having a structure to allow the opening and closing plate 11 to be inserted thereinto. An entrance 31 may be formed on the second body portion 30 to allow the opening and closing plate 11 to be inserted thereinto, and the opening and closing plate 11 inserted through the entrance 31 may descend until the opening and closing plate 11 blocks the center area (hollow portion) R of the first body portion 40. That is, since the entrance 31 of the second body portion 30 and the hollow space of the center R of the first body portion 40 are configured to communicate with each other, the opening and closing plate 11 inserted through the entrance 31 of the second body portion 30 may descend to the hollow space of the center R of the first body portion 40.

In the present embodiment, the packing seating groove 12 may be formed on the valve main body 10, in particular, on an inner surface 51 of the first body portion 40. The first body portion 40 may have the annular ring shape to have the hollow formed in the center R thereof, and the packing seating groove 12 may be formed on the inner surface 51 of the ring. The packing seating groove 12 may be formed on a position where the opening and closing plate 11 ascends or descends, and may be formed along the circumference of the inner surface S of the ring.

In the present embodiment, the packing seating groove 12 may have one end opened. After the packing 1 is fitted into the packing seating groove 12, the packing fixing ring 13 may be coupled to the opened portion of the packing seating groove 12 along with an O-ring 13'.

Figure 17:
FIG. 17 is a view to explain a packing seating groove in a valve main body according to an embodiment of the present disclosure.

FIG. 17 is a cross-sectional perspective view of a part of the valve main body according to an embodiment of the disclosure, and illustrates a state in which the packing 1 is not coupled. Although the shape or dimension of the valve main body illustrated in FIG. 17 may be different from that of the valve main body described with reference to FIGS. 1, 3, and 6, the valve main body illustrated in FIG. 17 may include all of the characteristic components included in the valve main body described with reference to FIGS. 1, 3, and 6. FIG. 17 is a view prepared for easy understanding of the packing seating groove 12 of the valve main body described with reference to FIGS. 1, 3, and 6. That is, referring to FIG. 17, the packing seating groove having one end opened, and the packing seating groove has the same structure as that of the packing seating groove 12 of the valve main body described with reference to FIGS. 1, 3, and 6.

In the present embodiment, bolt holes 15 may be formed on the valve main body 10 and the packing fixing ring 13 with reference to a coupling line 14. Bolts 16 may be inserted into the bolt holes 15, such that the packing fixing ring 13 can be securely fixed to the valve main body 10, and simultaneously, can closely press the packing 1 seated in the packing seating groove 12 toward the valve main body 10. Accordingly, the packing 1 seated in the packing seating groove 12 is not released. In the detailed description, the "coupling line" refers to a portion where the valve main body 10 and the packing fixing ring 13 meet.

The packing 1 coupled to the packing seating groove 12 configured as described above may come into close contact with the opening and closing plate 11, and may perform a sealing operation, and may be formed in a circular shape. In addition, the packing 1 may include two bodies (that is, a first packing PK1 and a second packing PK2), such that the packing can be easily manufactured and can be easily coupled to and decoupled from the packing seating groove 12. The first packing PK1 and the second packing PK2 may be seated in the packing seating groove 12 to face each other in contact with each other. When the first packing PK1 and the second packing PK2 are seated in the packing seating groove 12, a portion of the first packing PK1 and a portion of the second packing PK2 may face each other in direct contact with each other, and the other portion of the first packing PK1 and the other portion of the second packing PK2 may face each other, spaced apart from each other. As will be described below, the opening and closing plate 11 may be inserted into an insertion space S where the first packing PK1 and the second packing PK2 are spaced apart from each other.

Figure 8:
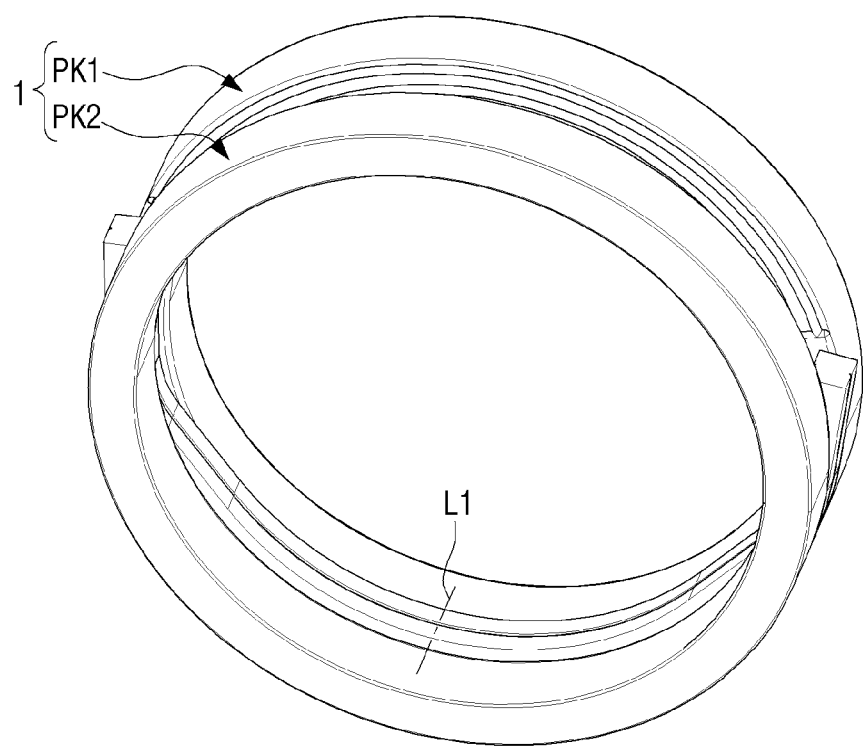
FIG. 8 is a view to explain the packing according to an embodiment of the present disclosure.
Figure 9:
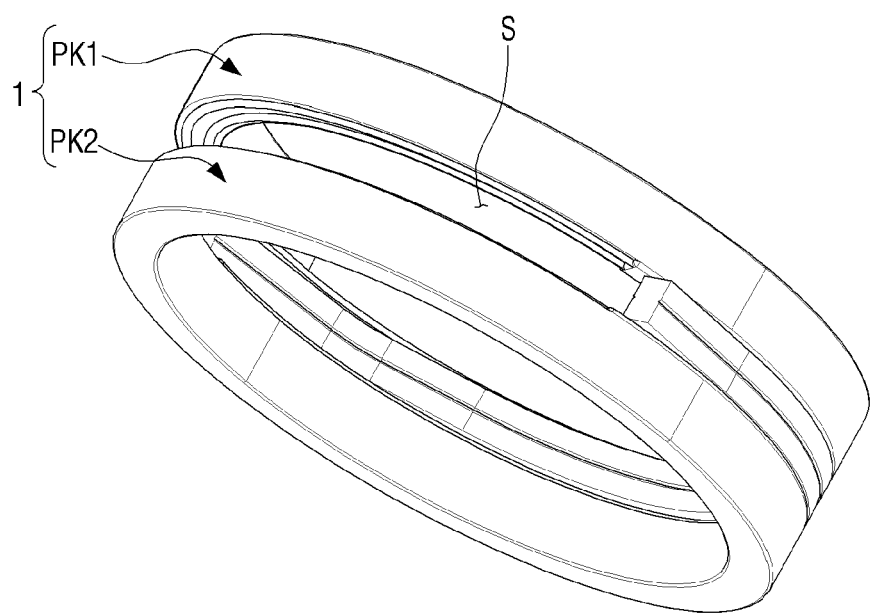
FIG. 9 is a view illustrating the packing of FIG. 8 as seen from a different direction.
Figure 10:
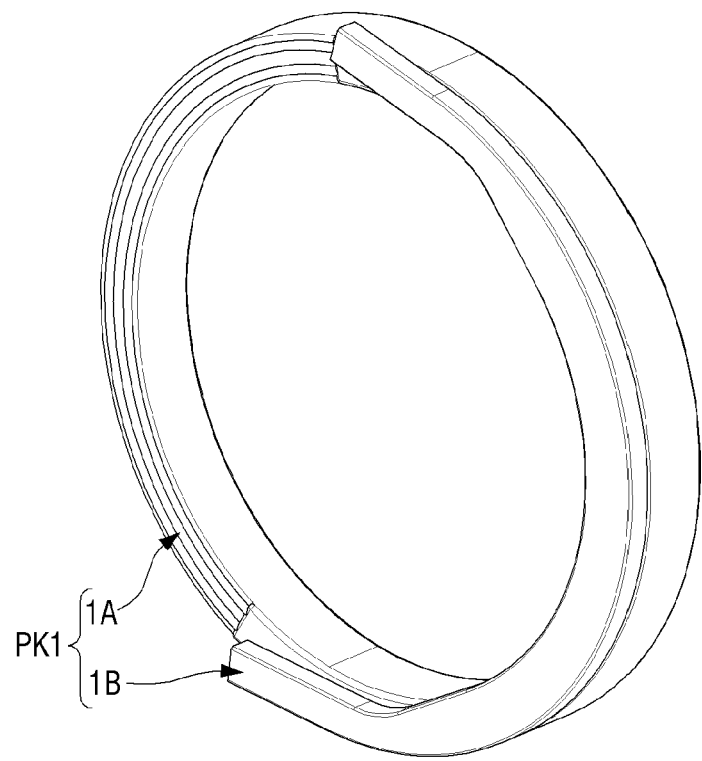
FIG. 10 is a view to explain a first packing PK1 included in the packing of FIG. 8.
Figure 11:
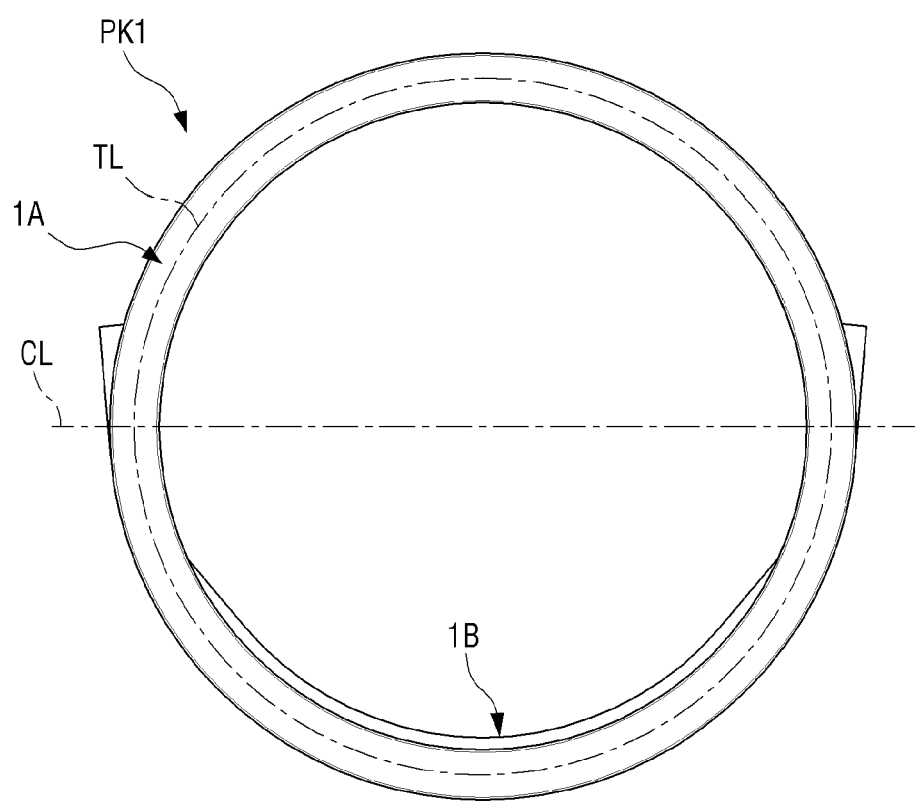
FIG. 11 is a view illustrating the first packing PK1 of FIG. 10 as seen from a different direction.
Figure 12:
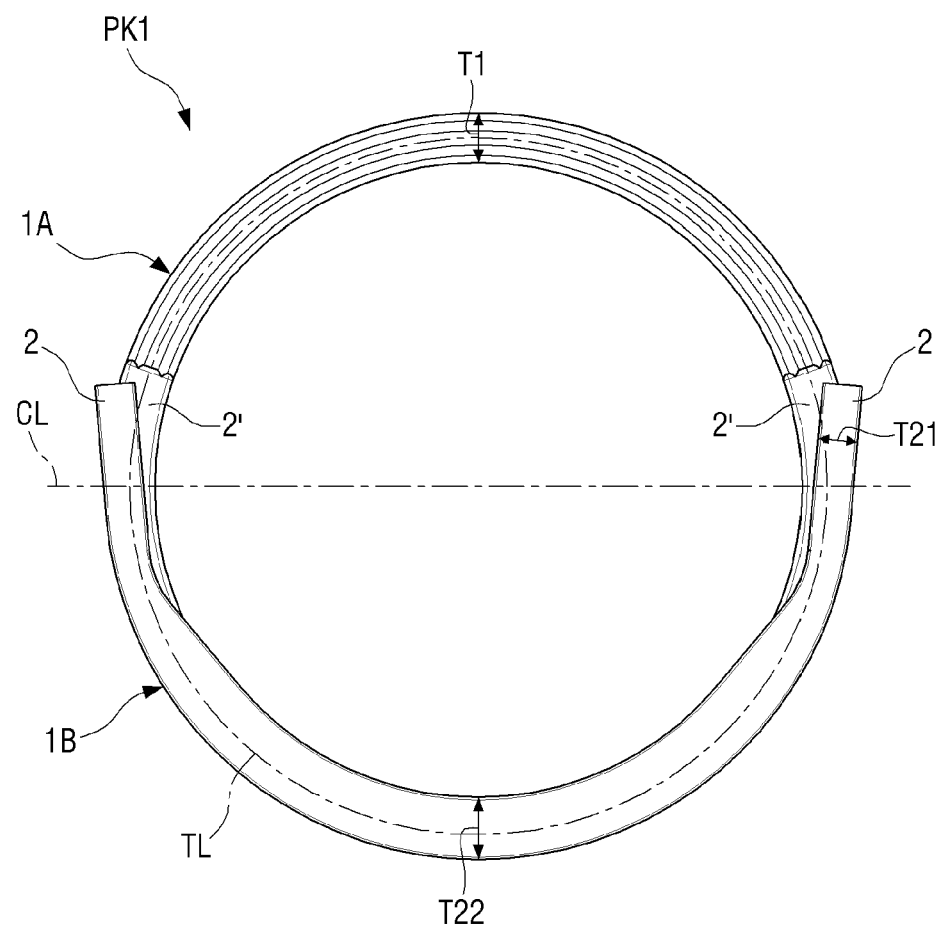
FIG. 12 is a view illustrating the first packing PK1 of FIG. 10 as seen from the opposite direction of FIG. 11.
Figure 13:
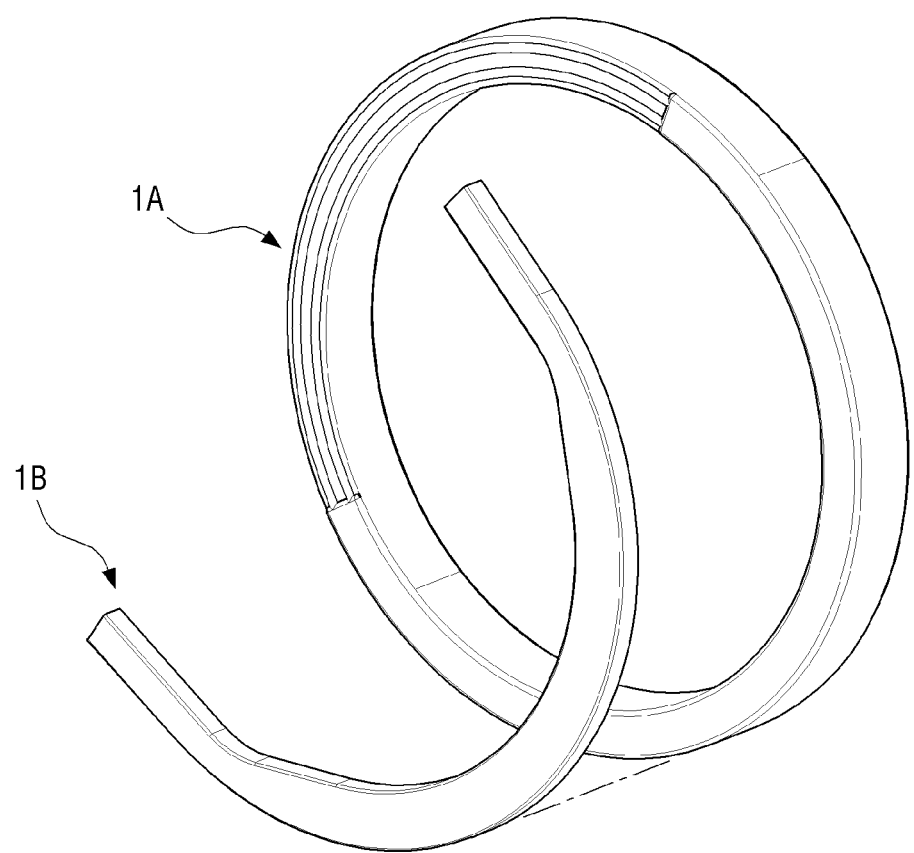
FIG. 13 is an exploded perspective view of a first ring and a second ring of the first packing PK1 of FIG. 10.
Figure 14:
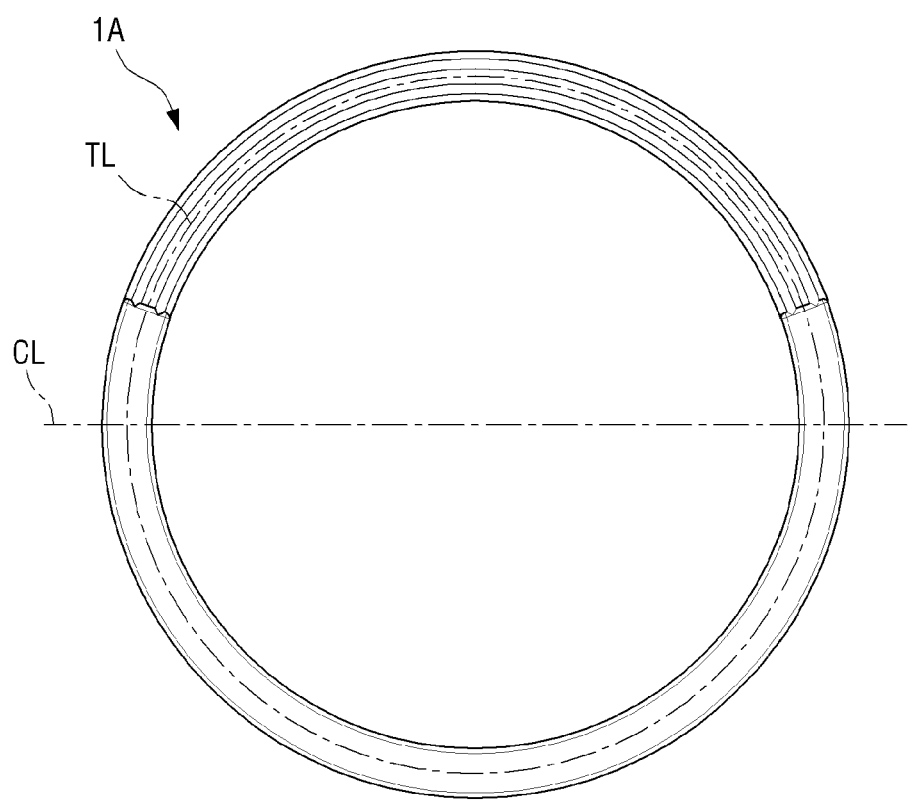
FIG. 14 is a view illustrating the first ring of FIG. 13.
Figure 15:
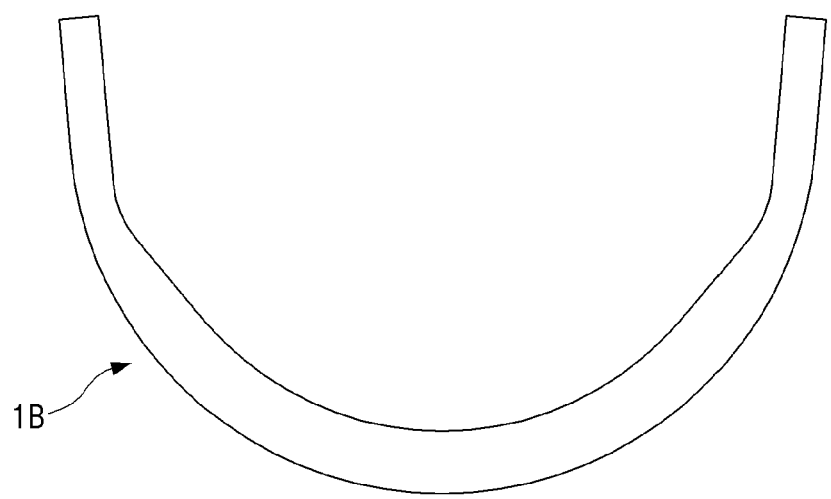
FIG. 15 is a view illustrating the second ring of FIG. 13.
Figure 16:
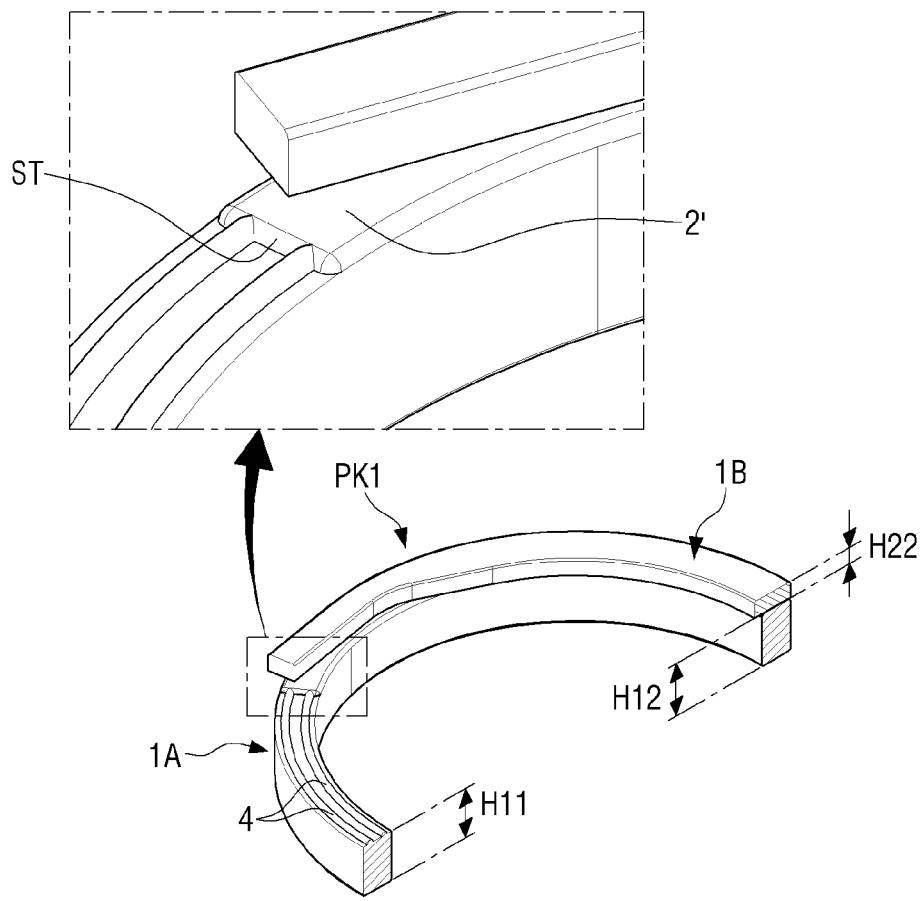
FIG. 16 is a perspective view illustrating a cross section of the packing of FIG. 10.

Hereinbelow, reference will be made to FIGS. 8 to 16 for easy understanding of the packing 10. FIG. 8. FIG. 8 is a view to explain the packing according to an embodiment of the present disclosure, FIG. 9 is a view of the packing of FIG. 8 seen from a different direction, FIG. 10 is a view to explain the first packing PK1 included in the packing of FIG. 8, FIG. 11 is a view of the first packing PK1 of FIG. 10 seen from a different direction, FIG. 12 is a view of the first packing PK1 of FIG. 10 seen from the opposite direction of FIG. 11, FIG. 13 is an exploded perspective of the first packing PK1 of FIG. 10 divided into a first ring and a second ring, FIG. 14 is a view illustrating the first ring of FIG. 13, FIG. 15 is a view illustrating the second ring of FIG. 13, and FIG. 16 is a perspective view illustrating a cross section of a portion of the packing of FIG. 10.

The shape or dimension of the packing illustrated in FIGS. 8 to 16 may be slightly different from the packing 1 of FIGS. 1 to 6. However, the packing shown in FIGS. 8 to 16 includes all of the characteristic components of the packing 1 described with reference to FIGS. 1 to 6. The packing shown in FIGS. 8 to 16 is prepared for easy understanding of the packing 1 described with reference to FIGS. 1 to 6.

Hereinafter, the packing shown in FIGS. 8 to 16 and the components of the packing will be given the same reference numerals as those of the packing 1 and the components of the packing 1 described with reference to FIGS. 1 to 6, and the packing 1 will be described in detail.

Referring to FIGS. 1 to 16, the packing 1 includes the first packing PK1 and the second packing PK2. The first packing PK1 and the second packing PK2 may form the insertion space S to allow the opening and closing plate 11 to be inserted thereinto. When the opening and closing plate 11 is inserted through the space S (hereinafter, referred to as an "insertion space") formed by the first packing PK1 and the second packing PK2, an edge portion of the opening and closing plate 11 may enter the insertion space S, first. That is, the opening and closing plate 11 and the packing 1 may have configurations complementary to each other to allow the edge portion of the opening and closing plate 11 to enter the insertion space S first.

The first packing PK1 and the second packing PK2 may be configured as ring assemblies, respectively. Since the first packing PK1 and the second packing PK2 have the same structure, one of them will be described in detail.

In the detailed description, the ring assembly includes two rings, and one of the two rings is referred to as a first ring 1A and the other one is referred to as a second ring 1B. The first ring 1A and the second ring 1B may be configured as one body or may be separately manufactured and then may be stacked one on the other.

The first ring 1A may be formed in a substantially annular shape, and the second ring 1B may be formed in a substantially semi-annular shape. In particular, both ends of the second ring 1B may have a linear shape. The portion having the linear shape will be referred to as a linear guide protrusion as will be described below.

The first packing PK1 has the second ring 1B stacked on the first ring 1A, and the second packing PK2 has the same configuration as the first packing PK1. When the packing 1 is coupled to the valve main body, the semi-annular ring of the first packing PK1 and the semi-annular ring of the second packing PK2 may come into close contact with each other (in particular, see FIGS. 8 and 9).

Referring to FIGS. 2, 11, 12, and 14, a horizontal center line CL and a circumferential line TL will be described. For the purpose of explaining the present disclosure, a virtual straight line passing through the center of the first ring 1A is referred to as the horizontal center line CL, and a virtual circle passing through the inner center of the first ring 1A is referred to as the circumferential line TL. An upper portion of the first ring A1 with reference to the horizontal center line CL is referred to as an upper portion of the packing 1, and a lower portion of the first ring 1A with reference to the horizontal center line CL is referred to as a lower portion of the packing 1.

In the present embodiment, the first ring 1A and the second ring 1B may be coupled to each other to overlap each other in part. That is, the second ring 1B may be stacked on the first ring 1A.

Specifically, the first ring 1A and the second ring 1B may be coupled to each other, such that the center of the second ring 1B overlaps the first ring 1A and both ends of the second ring 1B do not overlap the first ring 1A. More specifically, the center of the second ring 1B may be stacked on the first ring 1A along the circumferential line TL of the first ring 1A, and both ends of the second ring 1B may be stacked on the first ring 1 to deviate from the circumferential line TL of the first ring 1A.

The first ring 1A has a circular shape and both ends of the second ring 1B have a linear shape. Accordingly, both ends of the second ring 1B do not overlap the circumferential line TL of the first ring 1A, and deviates from the circumferential line TL of the first ring 1A.

According to an embodiment, the annular ring 1A and the semi-annular ring 1B may be integrally formed with each other or may be separately manufactured and may be coupled to each other.

In the present embodiment, a width T1 of the first ring 1A may have a substantially uniform value, but the second ring 1B may have different widths T2 (T21, T22) according to sections. The width T2 of the semi-annular ring 1B may increase from both ends to the center. For example, the width T21 of both ends (that is, the linear guide protrusion 2) of the second ring 1B may be smaller than or equal to the width T1 of the first ring 1A, and the width T22 of the center of the second ring 1B may be larger than the width T1 of the first ring 1A. Accordingly, the first packing PK1 may have different widths according to sections.

In the present embodiment, the linear guide protrusions 2 having a height and a width and linearly extended by a predetermined section and protruding may be formed at both ends of the second ring 1B. The height of the linear guide protrusion 2 may be smaller than a height of the first ring 1A, and the width of the linear guide protrusion 2 may be smaller than a width of the first ring 1A. In addition, the width of the linear guide protrusion 2 may be smaller than the width of the center of the second ring 1B.

Referring to FIG. 16, in the present embodiment, the height H1 (H11, H12) of the first ring 1A may be higher than the height H22 of the second ring 1B. The height H1 of the first ring 1A may vary according to sections. For example, the height H12 of a certain portion of the first ring 1A may be higher than the height H11 of the other portion of the first ring 1A. The second ring 1B may be stacked on the portion of the first ring 1a that has the height H12.

Referring to FIG. 16, a stepped portion ST may be formed on the portion of the first ring 1A on which the second ring 1B is stacked. A height of the stepped portion ST may be the same as or similar to a height of a protruding edge formed on the first ring 1A. In the present embodiment, at least one protruding edge 4 may be formed on the portion of the first ring 1A that does not overlap the second ring 1B along the first ring 1A. Specifically, the protruding edge 4 protrudes in parallel to the circumferential line TL of the first ring 1A. In the present embodiment, the protruding edge 4 may have a semicircular shape. As described above, a protruding height of the protruding edge 4 may be the same as or similar to the height of the stepped portion formed on the first ring 1A.

The first ring 1A and the second ring 1B having the above-described structures are coupled to each other, thereby forming a ring assembly. The first packing PK1 and the second packing PK2 have the ring assemblies, respectively. In addition, the first packing PK1 and the second packing PK2 may come into close contact with each other, thereby forming the configuration of the packing 1.

For example, the first packing PK1 and the second packing P2 come into close contact with each other, such that the second ring 1B of the first packing PK1 and the second ring 1B of the second packing PK2 face each other in contact with each other. The first ring 1A of the first packing PK1 and the first ring 1A of the second packing PK2 are spaced apart from each other. This is because, when the first packing PK1 and the second packing PK2 come into close contact with each other, the second rings 1B touch each other first.

The second ring 1B has two linear guide protrusions 2, and accordingly, the ring assembly has two linear guide protrusions 2. Since the packing 1 includes the first packing PK1 and the second packing PK2, the packing 1 includes four linear guide protrusions 2. That is, the four linear guide protrusions 2 may be formed on the packing 1. The linear guide protrusion 2 may be formed to linearly protrude by a predetermined section. The linear guide protrusion 2 may start from a predetermined position of the lower portion of the packing 1, may linearly protrude in an upward direction of the packing 1, and may be formed to be further away from the circumferential line TL of the packing 1 in the upward direction.

The first packing PK1 and the second packing PK2 may come into close contact with each other, such that the linear guide protrusion 2 of the first packing PK1 and the linear guide protrusion 2 of the second packing PK2 touch each other while facing each other. That is, the first packing PK1 and the second packing PK2 may be coupled to each other, such that the second ring 1B of the first packing PK1 and the second ring 1B of the second packing PK2 directly touch each other while facing each other. Accordingly, the linear guide protrusion 2 of the second ring 1B of the first packing PK1 and the linear guide protrusion 2 of the second ring 1B of the second packing PK2 may directly touch each other while facing each other. In addition, the first ring 1A of the first packing PK1 and the first ring 1A of the second packing PK2 may face each other, but may not touch each other and may maintain a predetermined space (that is, the insertion space S) therebetween. The opening and closing plate 11 may be inserted into the insertion space S formed by the first packing PK1 and the second packing PK2 as will be described below.

In the present embodiment, a support 2' may be formed on an area of the first ring 1A to support the opening and closing plate 11. The support 2' may be formed by the linear guide protrusion 2 which is formed out of the circumferential line TL of the packing 1. If the linear guide protrusion 2 is formed in a circular shape, not in a linear shape, and is formed along the circumferential line TL of the packing 1, the support 2' may not exist. The support 2' may function to support a portion of the opening and closing plate 11 when the opening and closing plate 11 enters the insertion space S.

The first packing PK1 includes two supports 2', and the second packing PK2 also includes two supports 2'. When the opening and closing plate 11 enters the insertion space S between the first rings 1A, the four supports 2' and the linear guide protrusions 2 may function to support and guide the opening and closing plate 11.

In the present embodiment, the opening and closing plate 11 may be formed in a plate shape, and may include surfaces L and an edge portion M. When the opening and closing plate 11 enters the insertion space S of the packing 1, the four supports 2' may support a portion of the surface L of the opening and closing plate 11, and the linear guide protrusions 2 may guide the edge portion M of the opening and closing plate 11 to allow the opening and closing plate 11 to descend through the insertion space S.

Figure 5:
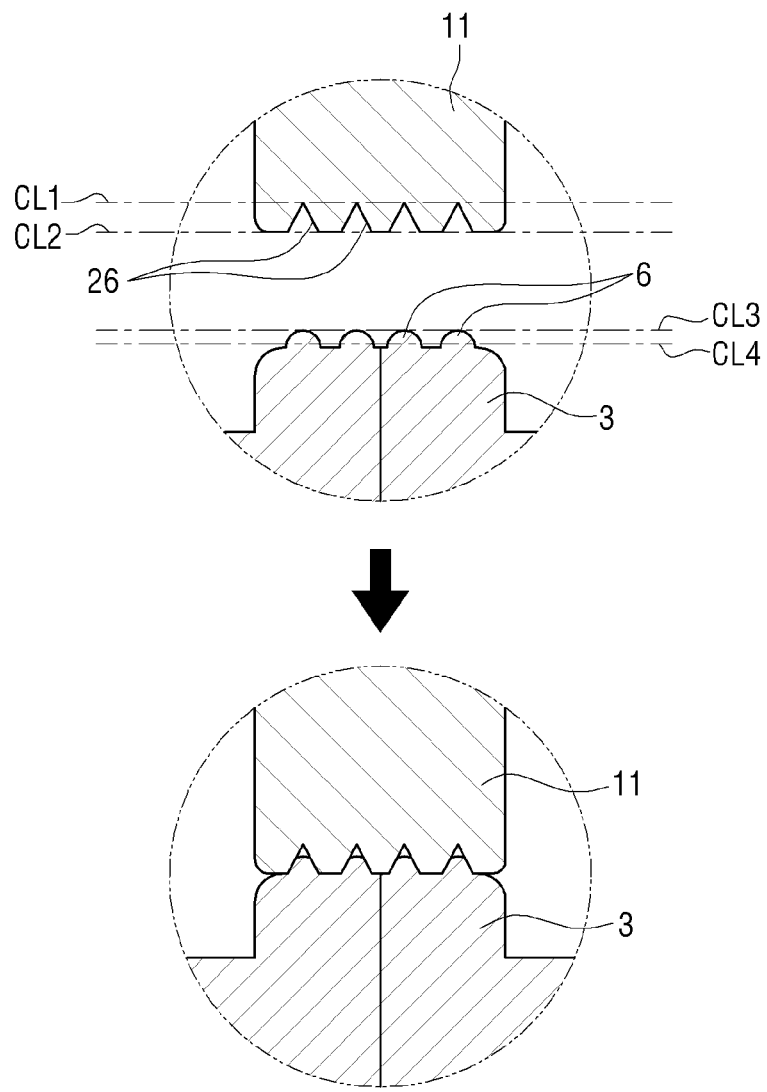
FIG. 5 is an enlarged view of the B portion of FIG. 3 (before and after being coupled)

In the present embodiment, a sealing structure 6 may be formed on the packing 1. Referring to FIGS. 5 to 8, the sealing structure 6 may be formed on a portion of the packing 1 that touches the edge portion M of the opening and closing plate 11 when the opening and closing plate 11 is completely inserted into the packing 1. For example, the sealing structure 6 may be formed on the second ring 1B. FIG. 5 illustrates a cross-section taken on the virtual line L1 of FIG. 8 on the assumption that the opening and closing plate 11 is inserted into the packing 1.

For example, the sealing structure 6 may protrude as long as a predetermined height of the packing 1, and may be formed on the second ring 1B. That is, the sealing structure 6 may be formed on a portion of the second ring 1B that touches the opening and closing plate 11. The shape of the sealing structure 6 may be formed to correspond to a cross-sectional shape of the opening and closing plate 11. That is, a sealing structure 26 (hereinafter, referred to as a "second sealing structure") may be formed on an edge portion of the opening and closing plate 11 to receive the protruding shape of the sealing structure 6 (hereinafter, referred to as a "first sealing structure"). The first sealing structure 6 and the second sealing structure 26 may have configurations complementary to each other so as to be coupled to or decoupled from each other.

A protrusion 3 may include the sealing structure 6, and the sealing structure 6 may be continuously formed along the circumferential direction of the second ring 1B. The sealing structure 6 may be formed substantially in parallel to the circumferential line TL of the packing 1. The shape of the first sealing structure 6 may be formed to correspond to the second sealing structure 26 formed on the opening and closing plate 11.

For example, if the first sealing structure 6 has a convex shape, the second sealing structure 26 may have a concave shape. To the contrary, if the second sealing structure 26 has a convex shape, the first sealing structure 6 may have a concave shape to receive the convex shape.

In the following embodiments, the first sealing structure has a convex shape (for example, a protruding semicircular shape), and the second sealing structure 26 has a concave shape (for example, a recessed triangular shape). However, this is merely an example and the present disclosure is not limited to such shapes. That is, other shapes than the semicircular shape or triangular shape may be applied to the sealing structure of the present disclosure. Alternatively, the first sealing structure 6 may have a concave shape, and the second sealing structure 26 may have a convex shape.

According to the above-described configuration, when the opening and closing plate 11 is inserted into the packing 1, the sealing structure 6 may come into contact with the sealing structure 26 formed on the edge portion M of the opening and closing plate 11 and may be press-fitted thereinto. In particular, when the sealing structure 6 is received in the sealing structure 26, the side surface of the sealing structure 26 can enhance sealability.

Figure 4:
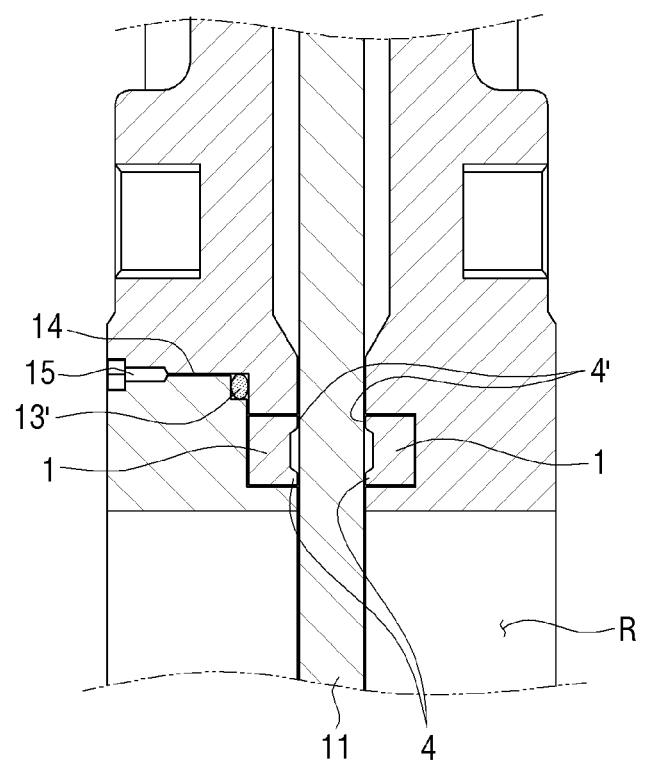
FIG. 4 is an enlarged view of the A portion of FIG. 3.

Referring to FIGS. 4 and 16, the protruding edge 4 may be formed on an upper portion of the packing 1. The protruding edge 4 may protrude and two or more protruding edges 4 may be formed along the circumferential direction of the first ring 1A. The two or more protruding edges 4 may be formed substantially in parallel to the circumferential line TL of the packing 1. The two protruding edges 4 may be formed at a predetermined interval, and, since the two or more protruding edges 4 are spaced apart from each other, the opening and closing plate 11 can easily ascend or descend while guaranteeing sealability.

According to the above-described embodiment, a component for enhancing sealability may be added to the opening and closing plate 11 and the packing 1. That is, the protrusion 3 may be formed on the second ring 1B of the packing 1 and the sealing structure 6 may be formed on the protrusion 3. In addition, the sealing structure 26 may be formed on the edge portion M of the opening and closing plate 11 to come into close contact with the sealing structure 6. The sealing structure 26 may be positioned on a corresponding position to come into direct contact with the sealing structure 6.

In the present embodiment, a plurality of sealing structures 6 may be continuously formed on the upper surface of the protrusion 3 of the packing 1 at predetermined intervals in parallel to one another in the form of a line having a semicircular cross-section. A plurality of sealing structures 26 may be continuously formed on corresponding positions at the same intervals as the sealing structures 6 in parallel to one another in the form of a triangular recess.

In the present embodiment, when the semicircular sealing structure 6 is inserted into the triangular sealing structure 26, the sealing structure 6 is coupled to the sealing structure 26 with its shape being changed to the triangular shape. Due to such an operation, the sealing structure 6 and the sealing structure 26 can be securely sealed.

Figure 7A:
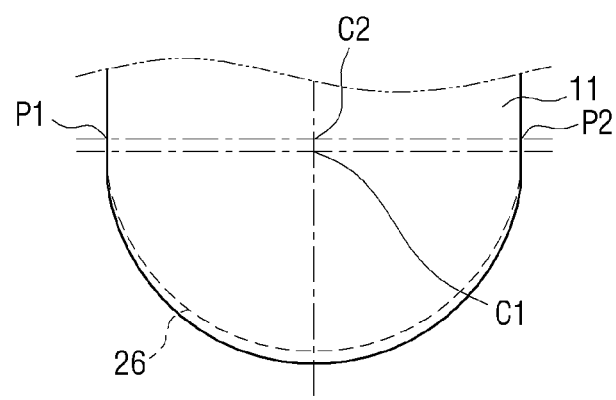
FIGS. 7A and 7B are views to explain the opening and closing plate and the packing according to an embodiment of the present disclosure.

FIG. 7A illustrates a portion of the surface L of the opening and closing plate 11. Referring to FIGS. 5 and 7A, a dash-dotted line CL1 is a virtual line and indicates recessed bottom of the sealing structures 26. When viewed from the direction of surface L, the recessed bottom may have a semicircular shape, and the center C2 of the semicircular shape is illustrated in FIG. 7A. A dash-dotted line CL2 is a virtual line and indicates the end of the edge portion of the opening and closing plate 11. When viewed from the direction of surface L, the end of the edge portion has a semicircular shape, and the center C1 of the semicircle is illustrated in FIG. 7A.

In the present embodiment, a position of the center C1 of the semicircle and a position of the center C2 of the semicircle may be different, and the position of the center C1 of the semicircle is lower than the position of the center C2 of the semicircle. In other words, the position of the center C2 of the semicircle is higher than the position of the center C1 of the semicircle.

Figure 7B:
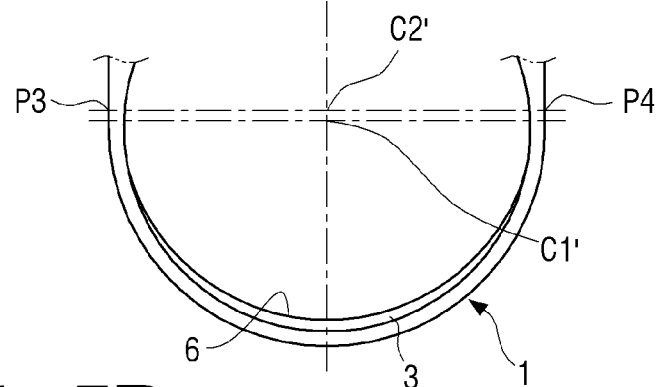

FIG. 7B illustrates a portion of the side surface of the packing 1. Referring to FIGS. 5 and 7, a dash-dotted line CL4 is a virtual line and indicates bottom of the protrusion 3. When viewed from the direction of surface L, the bottom has a semicircular shape and the center C1' of the semicircular shape is illustrated in FIG. 7B. A dash-dotted line CL3 is a virtual line and indicates protruding surface of the first sealing structures 6. When viewed from the direction of surface L, the protruding surface has a semicircular shape and the center C2' of the semicircle is illustrated in FIG. 7B.

In the present embodiment, the position of the center C1' of the semicircle formed by the protrusion 3 is different from the position of the center C2' of the semicircle formed by the protruding surfaces of the sealing structures 6, and the position of the center C1' of the semicircle is lower than the position of the center C2' of the semicircle. In other words, the position of the center C2' of the semicircle is higher than the position of the center C1' of the semicircle.

According to an embodiment, the second sealing structures 26 may be formed from an edge portion of a substantially center portion of the opening and closing plate 11 to a lowermost end of the opening and closing plate 11. The first sealing structures 6 may be formed on the packing 1, and may be formed on all areas that directly contact the second sealing structures 26 of the opening and closing plate 11.

For example, the second sealing structures may be formed from position P1 to position P2 where a horizontal line passing through the center C2 meets the opening and closing plate 11 along the edge portion of the opening and closing plate 11.

The first sealing structures 6 may be formed from position P3 to position P4 where a horizontal line passing through the center C2' meets the packing 1 along a surface of the protrusion 3 of the packing 1.

According to the above-described configuration, the second sealing structures 26 and the first sealing structures 6 are coupled to each other, such that the entire lower portion of the opening and closing plate 11 can maintain sealability.

In the drawings, reference numeral 50 indicates the transferring tubular body, reference numeral 51 indicates the operating rod, and reference numeral 52 indicates the handle.

Hereinafter, operations of the soft knife gate valve according to the present disclosure as described above will be described.

First, the valve main body 10 constituting the soft knife gate valve is installed in the transferring tubular body 50 in a general method and is used.

Transferring of a fluid transferred through the transferring tubular body 50 may be adjusted by the soft knife gate valve installed in this way.

For example, when the handle 52 is rotated, the operating rod 51 ascends or descends, and the opening and closing plate 11 operatively coupled with the operating rod 51 ascends or descends, thereby adjusting transferring of a fluid.

Hereinafter, a mutual sealing operation achieved by coupling the opening and closing plate 11 and the packing 1 constituting the soft plate type gate valve will be described in detail.

When the handle 52 is rotated in one direction to block the transferring of the fluid in the transferring tubular body 50, the operating rod 51 descends. As the operating rod 51 descends, the opening and closing plate 11 operatively coupled with the operating rod 51 also descends.

The opening and closing plate 11 descends while entering the insertion space S formed by the packing 1. Since the opening and closing plate 11 enters by being guided by the supports 2' and the linear guide protrusions 2 formed on the packing 1, the opening and closing plate 1 can smoothly enter the packing 1.

The opening and closing plate 11 descends until the lower portion of the opening and closing plate 11 comes into close contact with the protrusion 3 formed on the lower portion of the packing 1. The protrusion 3 is pressed by the sealing structures 26 formed on the lower portion of the opening and closing plate 11, and accordingly, sealability between the opening and closing plate 11 and the packing 1 can be enhanced.

According to the above-described embodiments, even if there is pressure (hereinafter, "transferring pressure") applied to the opening and closing plate 11 by the fluid, the opening and closing plate 11 can smoothly ascend or descend, and the fluid does not leak. That is, the opening and closing plate 11 can smoothly ascend or descend due to the two protruding edges 4, 4' formed on the inner surface of the upper portion of the packing 1, and sealability can be maintained. In addition, the sealability can be enhanced by the protrusion 3 formed on the lower portion of the packing 1, and the support 2', and the fluid can be completely prevented from leaking to the periphery of the opening and closing plate 11.

When the packing 1 installed in the packing seating groove 12 formed on the inner portion of the valve main body 10 wears down and is replaced with a new one, the opening and closing plate 11 may be lifted up and the worn-down packing 1 may be decoupled from the valve main body 10 and a new packing 1 may be coupled to the valve main body 10.

According to the above-described embodiments of the present disclosure, the first sealing structures 6 formed on the upper surface of the protrusion 3 of the packing 1 are continuously formed in a semicircular shape, and the second sealing structures 26 are continuously formed on positions corresponding to the sealing structures 6 in a triangular shape. When the semicircular first sealing structures 6 are inserted into the triangular second sealing structures 26 due to the descending movement of the opening and closing plate 11, the first sealing structures 6 are subject to the pressure applied by the second sealing structures 26, and have their shape changed to the triangular shape and are coupled to the second sealing structures 26.

In addition, as can be seen from the embodiments described above with reference to FIGS. 5 and 7, the second sealing structures 26 of the opening and closing plate 11 are arranged in a semicircular shape from a position higher than the center C1 of the semicircle forming the edge portion of the opening and closing plate 11. In addition, the first sealing structures 6 of the packing 1 are also arranged in a semicircular shape from a position higher than the center C1' of the semicircle forming the protrusion 3. Accordingly, the respective lower portions of the opening and closing plate 11 and the packing 1 are securely coupled to each other due to the mutual coupling between the sealing structures 6 and the sealing structures 26.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present disclosure.

What is claimed is:

1. A soft seat knife plate type valve comprising:
   a valve main body;
   a packing removably coupled to the valve main body; and
   an opening and closing plate configured to be inserted into the packing,
   wherein the opening and closing plate and the packing are operatively coupled to each other,
   wherein the packing comprises a first packing and a second packing, and the first packing and the second packing are configured to form a space to allow the opening and closing plate to be inserted thereinto,
   wherein the opening and closing plate and the packing are structured, such that an edge portion of the opening and closing plate is inserted into the space, first, when the opening and closing plate is inserted into the packing,
   wherein a first sealing structure is formed on the packing,
   wherein a second sealing structure is formed on the edge portion of the opening and closing plate,
   wherein the first sealing structure has a protruding semicircular shape and the second sealing structure has a recessed triangular shape, and
   wherein, when the opening and closing plate is inserted into the packing, the protruding semicircular shape of the first sealing structure and the recessed triangular shape of the second sealing structure are in contact with each other.

2. The soft seat knife plate type valve of claim 1, wherein the first packing has a semi-annular ring stacked on an annular ring,
   wherein the second packing has a semi-annular ring stacked on an annular ring, and
   wherein, when the packing is coupled to the valve main body, the semi-annular ring of the first packing and the semi-annular ring of the second packing come into contact with each other.

3. The soft seat knife plate type valve of claim 2, wherein the first sealing structure is formed on the semi-annular rings.

* * * * *